United States Patent [19]
Pinckney

[11] 3,725,981
[45] Apr. 10, 1973

[54] JOINT CONSTRUCTION AND METHOD OF FABRICATION

[75] Inventor: Robert L. Pinckney, Glen Mills, Pa.

[73] Assignee: The Boeing Company, Seattle, Wash.

[22] Filed: Oct. 7, 1970

[21] Appl. No.: 78,727

[52] U.S. Cl..................24/122.3, 287/82, 24/123 W, 24/115 A
[51] Int. Cl.............................................F16g 11/00
[58] Field of Search..............................287/82, 124; 24/122.3, 122.6, 123 W, 115 A

[56] References Cited

UNITED STATES PATENTS

| | | | |
|---|---|---|---|
| 3,218,753 | 11/1965 | Wylie | 24/122.6 X |
| 3,570,074 | 3/1971 | Schimmeyer et al. | 287/82 X |
| 3,367,686 | 2/1968 | Kurz | 287/124 X |

*Primary Examiner*—Andrew V. Kundrat
*Attorney*—Albert W. Hilburger and Joseph M. Corr

[57] ABSTRACT

A structural joint construction for connecting a first member of composite material to a second member which may be of composite material or of some other material. The construction enables tensile, compressive, torsional, and bending loads to be transmitted from the first member to the second member with a high degree of efficiency. One end of the first member is in abutting relationship with a free end of the second member such that a plurality of ends of first filament material integral with the core extends beyond its end and overlies the outer surface of the second member. The outer surface of the second member is contoured to include a central portion of minimal cross-sectional area bounded by opposing portions of greater cross-sectional areas. Other filament material is wrapped around the first filament material in a direction transverse to the axes of the first and second members such that the ends of the first filament material conform to the contour of the outer surface of the second member and are held fast to the second member.

11 Claims, 14 Drawing Figures

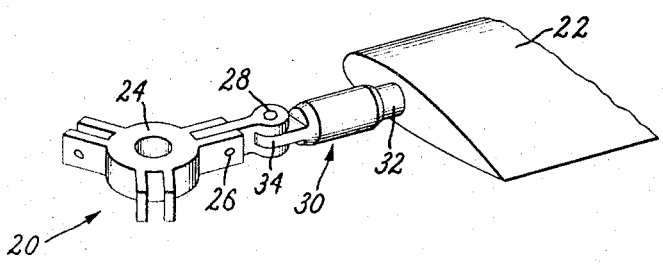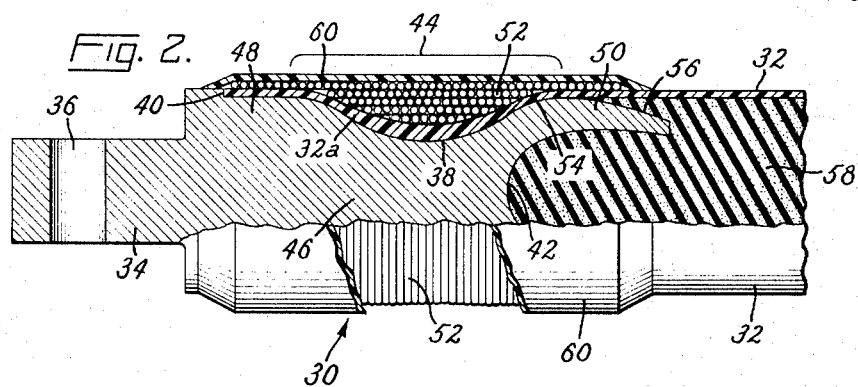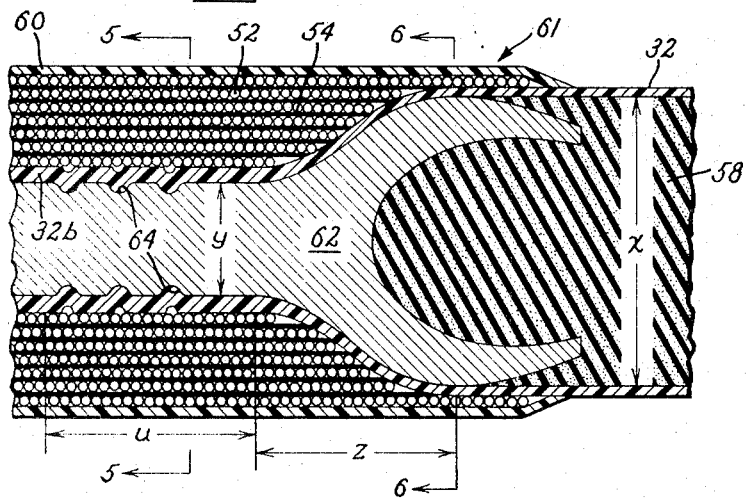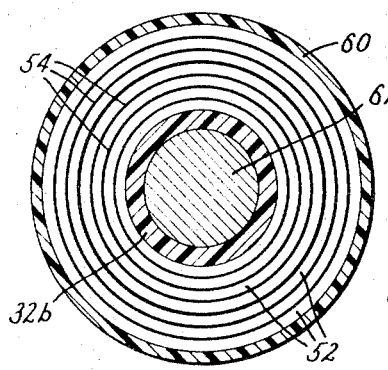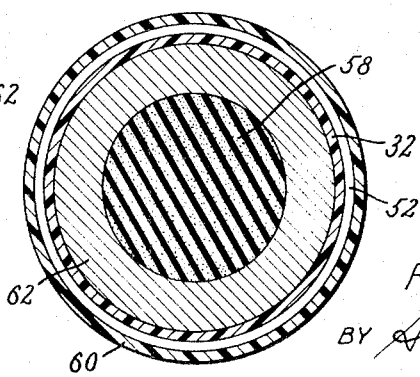

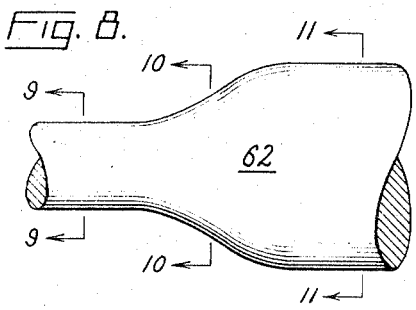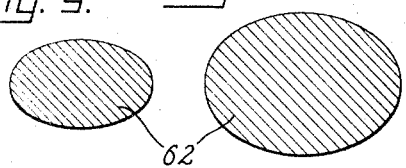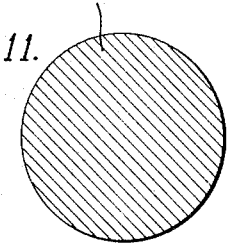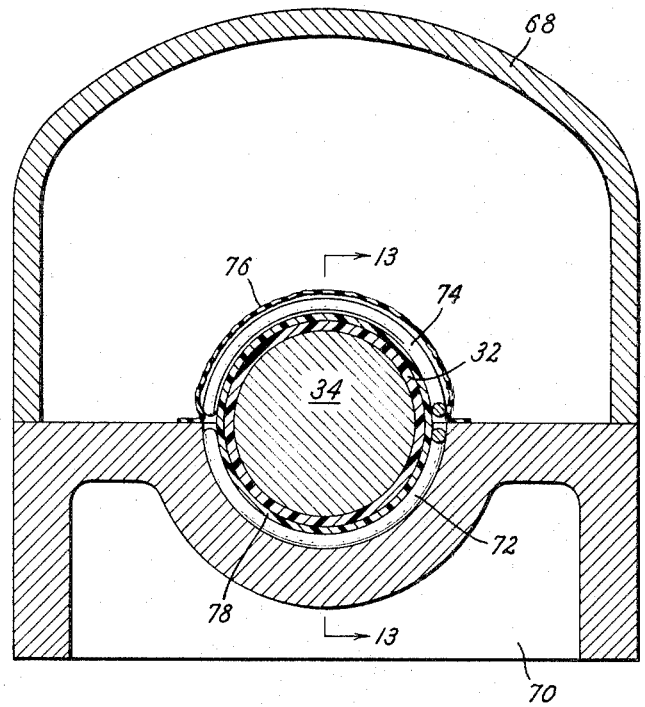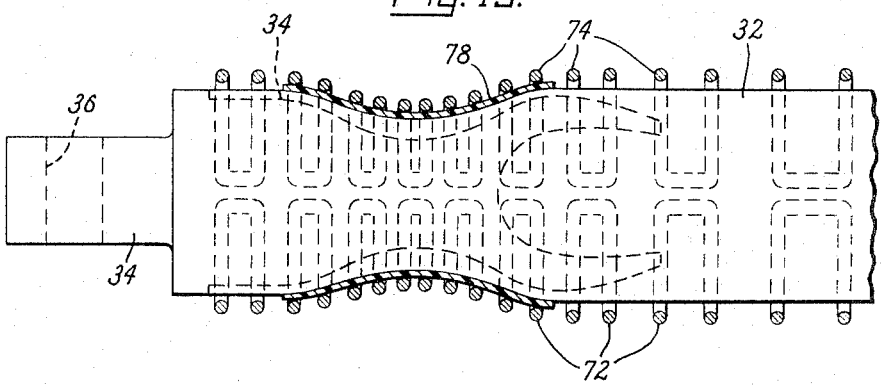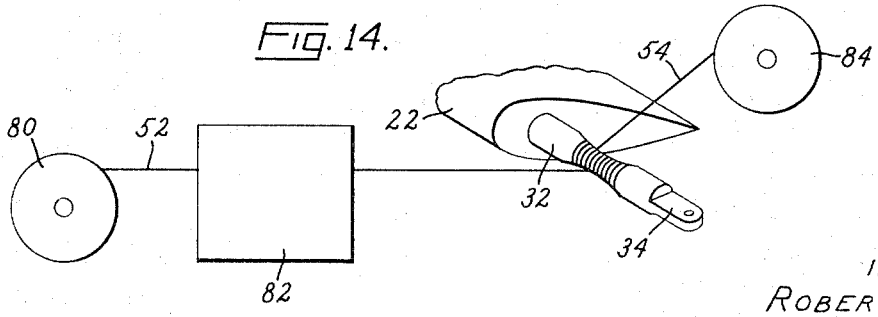

3,725,981

JOINT CONSTRUCTION AND METHOD OF FABRICATION

BACKGROUND OF THE INVENTION

The present invention relates generally to a novel joint construction and method of forming same and specifically to a joint construction wherein at least one of the members to be joined is fabricated from a composite material.

In recent years, significant advances have been made in the development and use of new materials and different forms of old materials for all manner of applications. So-called "composite" materials constitute one broad category of such materials which appears commercially attractive and applicable to a broad range of uses. Composite materials are normally composed of a plurality of uni- or multi-directional high modulus continuous or discontinuous fibers supported in a matrix material. The function of the matrix material is to transfer the loading from fiber to fiber by adhesive shear strength, maintain separation between the fibers, protect them from abrasion, and generally to hold them together in a rigid shape. The most common matrix materials have been epoxy resins, although other resins and even metals are employed in many instances.

Heretofore, fastening or joining conventional materials such as wood and metals has been achieved by conventional devices such as rivets, nuts, bolts, clamps, and the like. However, such conventional devices are not readily adapted to composite materials because of the nature and physical construction of such materials. Conventional fasteners often require a tight dimensional tolerance range which may be difficult to achieve with composite materials. Furthermore, most of the conventional fasteners rely on the shear and/or bearing strengths of the respective objects to be joined. By their nature, composite materials generally have less desirable shear and bearing characteristics than conventional materials. Thus, conventional fasteners such as rivets or bolts applied to composite structures would unduly deform the structure because of the compressive loading necessary to achieve a joint and, upon the substantial degree of loading which results from use, would cause it to tear and otherwise damage the structure. Similarly, such devices as clamps are relatively expensive and complex in design and in the main are undependable. Their chief drawback, however, resides in the fact that the resulting construction usually fails to maintain a design preload or compressive load due to long term creep and deformation of the composite materials.

While composite materials have many benefits over conventional materials, it can be seen that their value is substantially limited in the absence of techniques enabling them to be properly joined either with other composite materials or with conventional materials. The invention thus presents a technique for joining composite structures which overcomes the disadvantages of conventional fastening devices while assuring a connection which has excellent strength characteristics when subjected to tensile, compressive, bending and torsional loads.

According to the invention, improved structural efficiency is achieved by a construction which utilizes the excellent tensile and elastic characteristics of composite materials. At the same time, the invention employs a construction which has the ability of absorbing the relatively broad tolerance range normally associated with composite structures.

Thus, a first or composite member is positioned in end-to-end relationship with a second member such that a plurality of ends of first fiber material integral with the first member and extending beyond its end overlies the outer surface of the second member. The outer surface of the second member is contoured to a shape having a central portion of minimal cross-sectional area bounded by opposing portions of greater cross-sectional areas. Other fiber material is then wrapped around the first fiber material together with an appropriate resin in a direction transverse to the axes of the first and second members such that the ends of the first fiber material conform to the contour of the outer surface of the second member and are held fast to the second member. Prior to being wrapped around the first fiber material, the second fiber material is preferably heated so as to achieve a thermal expansion of the fibers, and subsequent shrinking while cooling, thereby assuring a firm joint construction.

The contour of the second member is controlled within reasonably achievable tolerances as a compromise whereby the first fiber material is able to conform to the second member without imposing undue stresses on the first fiber material while yet providing that degree of directional change which will enable an effective wedging action between the second fiber material and the first fiber material whereby the joint is sound in tension and compression. Similarly, the ratio of length of the central portion of the second member to diameter of the opposing portions is chosen to achieve optimum characteristics in bending to assure that the fibers of the first fiber material will not be overstressed by too severe a curvature. In like manner, to improve the characteristics of the joint construction in torsion, it may be desirable to provide a plurality of longitudinal grooves in the second member. This will serve to provide an improved mechanical connection between the first fiber material and the second member. Alternatively, also for the purpose of improving the characteristics of the joint in torsion, the second member, in the region of the central portion, may be designed with an elliptical cross-section.

A primary object of the invention is to provide a new and improved joint construction for connecting members composed of composite materials with other members.

Another object of the invention is to provide a new and improved joint construction employing composite materials and which ensures the strength thereof in tension, compression, bending and torsion.

A further object of the invention is to provide a new and unique method of fabricating the aforesaid joint construction.

Other and further objects and advantages will be made apparent in the description which follows, together with accompanying drawings wherein like numerals refer to like parts throughout.

In the Drawings:

FIG. 1 is a perspective view of a portion of a rotor system utilizing the invention;

FIG. 2 is a fragmentary side elevation view, partly in section, of elements illustrated in FIG. 1 and defining one embodiment of the invention;

FIG. 3 is a detail section view of parts illustrated in FIG. 2, but presenting a somewhat modified construction;

FIG. 4 is a view similar to FIG. 2 and illustrating another embodiment of the invention;

FIGS. 5 and 6 are section views taken along lines 5—5 and 6—6, respectively, of FIG. 4;

FIG. 7 is a section view similar to FIG. 5, but illustrating another embodiment of the invention;

FIG. 8 is a fragmentary side elevation view of one element of another embodiment of the invention;

FIGS. 9, 10, and 11 are section views taken along lines 9—9, 10—10, and 11—11, respectively, in FIG. 8;

FIG. 12 is a section view in elevation of apparatus employed in one step of the fabrication of the joint construction;

FIG. 13 is a section view taken along lines 13—13 of FIG. 12; and

FIG. 14 is a schematic representation of additional steps employed in the fabrication of the joint construction.

Refer now to the drawings and initially to FIG. 1 which illustrates a portion of a simplified rotor system 20 which embodies the joint construction disclosed herein. Although the particular embodiment shown in FIG. 1 relates to the construction of a rotor system, it should be understood that the invention is capable of application to any construction wherein a pair of elongated members are to be joined and at least one of the members is of a composite material. Thus, the invention can be used in a variety of other applications such as drive shafts, push rods, and the like, although for purposes of description the present disclosure will be limited to its application to a rotor blade construction.

Thus, in FIG. 1, the rotor system 20 includes a rotor blade 22 mounted to a hub 24 in any desirable manner which permits movement about flapping, lead-lag, and pitch axes of the blades 22. In FIG. 1, an articulated connection is shown which permits flapping movement about an axis defined by a hinge pin 26 and lead-lag movement about an axis defined by a hinge pin 28. The pitch axis of the rotor blade 22 is coincident with the longitudinal axis of a joint 30 which serves to connect a spar 32 integral with the rotor blade 22 to the hub 24.

FIG. 2 serves to illustrate in detail the construction of the joint 30 which is one of many possible embodiments of the invention. As shown therein, a first member or blade spar 32, which is illustrated as a tube of composite material, is in overlying relationship with a second member or fitting 34 which itself may be of composite material or of any other suitable material. The fitting 34 is provided with a transverse bore 36 adapted to receive the hinge pin 28, FIG. 1, to permit motion of the blade 22, FIG. 1, about its lead-lag axis. A plurality of ends 32a of first elongate material integral with the blade spar 32 overlie and conform closely with the outer peripheral surface 38 of the fitting 34. Examples of the first elongate material include boron and S-glass fibers embedded in a suitable resin matrix. The fibers comprising the ends 32a may be oriented in any suitable direction in accordance with the dictates of particular structural requirements. For example, they may be parallel to the blade spar or rotated therefrom approaching 90° or in any desirable intermediate orientation. The outer surface 38 of the fitting 34 is contoured with a curved surface having a sufficiently large radius of curvature that the ends 32a, which may have a relatively low yieldability, will not be stressed close to or in excess of their ultimate strength. On the other hand, the amount of curvature applied to the fitting 34 must be of a sufficient magnitude to achieve a firm joint between the spar 32 and the fitting 34. The outer peripheral surface 38 of the fitting 34 may be undercut at 40 so as to accommodate the thickness of the ends 32a whereby the outer diameter of the joint 30 is substantially the same as that of both the spar 32 and the fitting 34.

The fitting 34 which may have a cavity 42 at its extreme right hand or outboard end (FIG. 2) is provided with a connecting region 44 spaced from its end adjacent the blade spar 32. This connecting region 44 includes a central portion 46 of minimal cross-sectional area intermediate opposing portions 48 and 50 of greater cross-sectional area. The outer surface of the connecting region 44 expands gradually and smoothly from the central portion 46 toward the opposing portions 48 and 50 such that the outline of the contour, as seen in longitudinal cross-section, may, for example, depict a sine wave. To hold the ends 32a fast in contiguous relationship with the outer surface 38 of the fitting 34, a second elongate or circumferential material 52 is suitably wound around the ends 32a in alternate layers with a suitable resin 54 within the cavity defined by the central portion 46. One type of such circumferential material 52 which has been utilized and found to be desirable is known as "rocket" wire, which is a high carbon steel wire having a nominal diameter of 0.0032 inches and a tensile strength of approximately 500,000 psi. Other suitable circumferential materials include E-glass and boron in filament form. The circumferential material 52 is heated to increase its effective length, then wound tightly in alternate layers with the resin 54 about the central portion 46 and outwardly towards the opposing portions 48 and 50 to a suitable depth and in such a manner that it forms an outer surface having substantially the same diameter as the outer surface 38 at the opposing portions 48 and 50. Thereupon, the circumferential material 52 is allowed to cool and shrink, thus substantially increasing the restraining forces developed therein.

It has been found desirable to provide a chamfered surface 56 adjacent the extreme right hand or outboard end (FIG. 2) of the fitting 34 to assure that flexure of the joint 30 will not unduly stress the ends 32a. Such high stresses could otherwise occur if the ends 32a were to engage a sharp corner at the extremity of the fitting 34.

In order to increase the rigidity of the resulting construction, the interior of the blade spar 32, the cavity 42, and the void resulting from the chamfered surface 56 may be provided with a filler material 58 such as epoxy or polyurethane foam or other preferably lightweight but relatively rigid material. Finally, in order to prevent entry of moisture and also to provide abrasion resistance, a suitable resin 60 may be applied to the outer surface of the circumferential material 52.

In FIG. 3, a further aid is illustrated for the purpose of avoiding the possibility that fibers of the ends 32a might be excessively stressed in the region of the interface between the blade spar and the fitting. As shown, a modified fitting 34a of solid construction and the blade spar 32 and its attendant filler material 58 are separated by means of a suitably formed filler block 59 of a resilient material. Upon bending, the undersurface of the ends 32a are firmly supported by the outer surface of the block 59, thereby preventing any highly concentrated stresses in the fibers which could result in their fracture.

The relative dimensions of the connecting region 44 are critical within a fairly well defined range of tolerances in assuring an effective joint 30. As previously explained, the joint 30 is capable of withstanding very high loading in tension, compression, torsion, and bending. For a discussion of the design considerations which should be made in order to achieve an optimum joint construction, refer now to FIGS. 4, 5, and 6 which illustrate a modified joint 61. In FIG. 4, $x$ refers to the outside diameter of a modified fitting 62 at its maximum cross-sectional area and $y$ at its minimum cross-sectional area. $Z$ is the distance between the locations of maximum cross-sectional and minimum cross-sectional area and $u$ is the length of the substantially minimum cross-sectional area.

Consider first the instance of tensile loading on the joint 61. A plurality of ends 32b of first elongate material integral with the blade spar 32 (FIG. 4) will tend to exert a compressive or crushing force radially inwardly against a fitting 62 which is somewhat different in design from fitting 34 illustrated in FIG. 2. The former (FIG. 4) is shown for the purpose of discussing the design considerations with respect to the joint 61, while the latter (FIG. 2) is an optimum design which reflects a design compromise based on intended usage and in light of the primary loading conditions. The magnitude of the compressive or crushing force is a direct function of the load borne by the spar 32 and the slope of the tapered surface of the fitting 62. It will be appreciated that a substantial benefit is realized when the joint 61 is subjected to tensile loading. This benefit results by reason of the fact that the thickness of the ends 32b increases from a minimum adjacent that portion of the fitting 62 at its maximum cross-sectional area to a maximum adjacent that portion of the fitting 62 at its minimum cross-sectional area. In this manner, the ends 32b are wedged between the fitting 62 and the circumferential material 52. By reason of this wedging action, for the ends 32b to slide longitudinally of the fitting 62, they must be flared radially outwardly relative to the longitudinal axis of the fitting and the individual fibers must spread apart circumferentially resulting in a deformation of the fiber and matrix composition.

Since the fitting 62 must bear the strain imposed by the ends 32b, the structural properties of the material selected for the fitting, namely tensile strength and tensile and compression moduli of elasticity must be considered in determining the relative values of $x$, $y$ and $z$. Similarly, the tensile strength and the tensile modulus of the circumferential material 52 must also be considered in selecting the relative values of $x$, $y$, and $z$. In the latter instance, the use of a relatively low modulus material, such as E-type glass fibers, will necessitate a greater ratio of $x$ to $y$ in order to adequately load the circumferential material 52. In this manner, it is possible to exert an adequate circumferential restraining force on the ends 32b. In addition, the relative values of the quantities $x$, $y$, and $z$ must be such that any resulting elastic deformation of the joint adhesive and resin systems is not exceeded before the necessary restraining force in the circumferential material 52 is reached. Different relative values of $x$, $y$, and $z$ will be found desirable if a circumferential material 52 having a high modulus of elasticity, such as a high carbon steel or boron fiber, is employed. Furthermore, elastic strain characteristics of adhesives and resins which are employed in the joint construction can be reduced if the circumferential material 52 has a high modulus or if a relatively large ratio of $x/y$ is employed.

It should be understood that the quantity of the circumferential material 52 required to exert the restraining force necessary to hold the ends 32b in position on the fitting 62 will vary in proportion to the slope of the outer surface of the fitting 62 from the portion of maximum cross-sectional area to the portion of minimum cross-sectional area. As seen in FIG. 4, the quantity of the circumferential material 52 adjacent the fitting's portion of maximum cross-sectional area is less than that required at the portion of minimum cross-sectional area. This results by reason of the diminishing radial vector force occurring as the slope of the outer surface of the fitting 62 approaches zero.

In the instance of a compressive loading being applied to a joint constructed in accordance with the invention, a consideration of the forces involved will be similar to that just discussed with respect to tensile forces thereon. When compression is taken into consideration, the symmetrical configuration of a joint construction such as that shown in FIG. 2 in which the opposing portions 48 and 50 are equal in diameter has proven to be the most efficient configuration. This results by reason of the wedging action previously explained in the discussion relating to tensile loading of the joint 30. In this instance, the ends 32a are wedged between the sloping surface of the opposing portion 48 and the circumferential material 52.

Consider now the instance of bending loads being applied to the joint 61. For maximum strength in bending it is preferable that the values of $u$ and $z$ be of a substantial length compared with the values of $x$ and $y$. In this manner, shearing forces between the fitting 62 and the spar 32 are minimized by providing a large area of distribution. It might also be desirable to form the portion of the fitting 62 having minimum cross-sectional area with a number of parallel annular depressions 64 (FIG. 4) which serve to mechanically restrain the ends 32b and prevent the development of undue shear stresses in the spar 32.

Finally, consider the instance in which the joint 61 must transmit loads in torsion. To optimize the design of the joint 60 to withstand this type of loading it is desirable to form the outer surface of the minimum cross-sectional area region of the fitting 62 with a plurality of generally longitudinally extending grooves 66 suitably spaced about the peripheral surface thereof. Such a construction is illustrated in FIG. 7. The fibers of the ends 32b become embedded in the grooves 66, thereby providing a mechanical interconnection between the fitting 62 and the ends 32b. This is an improvement over the mere adhesive connection provided by the construction depicted in FIG. 5. Similarly, FIGS. 8 through 11 illustrate an alternate arrangement wherein the shape of the connecting region of the fitting 62 in section is elliptical or oval, thereby improving an interference reaction between the ends 32b and the fitting.

The reader will appreciate that the application of a torsional force upon the joint construction induces a compressive normal or radial force in certain regions of the fitting 62 and opposing interfiber or transverse tensile forces in the blade spar 32. These forces must be restrained by the circumferentially placed circumferential material 52. The maximum transverse forces appear at the point of maximum ovality and this location should coincide by design with the area containing the greatest amount of circumferential material 52 as determined by other loading conditions.

The immediately preceding discussion is intended to briefly outline the basic design considerations required for each of the conditions of tension, compression, bending and torsion and further to demonstrate the integration of these conditions into a single joint configuration. As previously mentioned, it is to be appreciated that any resulting joint construction must of necessity be a compromise in design and will reflect a construction which will tend to favor the primary loading condition for which the joint is to be used.

In order to fabricate the joint 30, (returning to FIG. 2 for the moment), it is desirable to place the fitting 34 and the blade spar 32 in a suitable manner in overlying relationship within a suitable pressure vessel 68 (FIG. 12). As seen in FIG. 12, the spar 32 and the fitting 34 are supported on a tool 70 which is provided with a semi-circular removable flexible heating element 72 which longitudinally conforms to the contour of the fitting 34. A flexible heater 74 is placed over the remaining exposed portions of the ends 32a as they are laid over the fitting 34. The flexible heater 74 is forced toward and against the outer surface of the fitting 34 as pressure is applied within the pressure vessel 68 to a suitable pressure bag 76 overlying the flexible heater 74 which is sealed to the tool 70. The advantage of this sytem is that differential rates of heat input may be accomplished along the joint to minimize thermal stresses during the cure step. This can be accomplished (see FIG. 13), for example, by means of varying the spacing between the adjacent heater elements 72 and 74 whereby the watt density is greatest where the thickness and heat capacity of the components being cured is greatest. The reader will therefore appreciate that, as shown in FIG. 13, the spacing between adjacent elements (both 72 and 74) is least in the region of the fitting 34 and is greatest in the region of the blade spar 32. Further, an economy in the quantity of heating and subsequent cooling is realized since only the components being bonded are heated. Heating and cooling of the large tool mass and pressure vessel 68 is not required as it is in more conventional systems. Such materials as fiber glass or ceramics having low heat conductivity may be used in the construction of the tool 70.

It is preferred that, prior to insertion within the pressure vessel 68, the outer layers of the ends 32a be wrapped with a heat shrinkable elastomer material 78, such as polyvinyl alcohol or polyestertape. After being subjected to a pressure of approximately 100 psi at 350°F for a period of 1 hour for epoxy matrix materials, the ends 32a are cured such that they continuously conform with the contour of the fitting 34. Thereupon the unit, including the blade spar 32 and the fitting 34, is removed from the pressure vessel 68 and the heat shrinkable material 78 is stripped from the outer surface of the ends 32a.

At this stage, the uncured epoxy resin film or other matrix material or resin 54 is preferably applied to the outer surface of the ends 32a in a series of layers interspersed with the second filament material 52. As shown schematically in FIG. 14, the second filament material is drawn from a reel 80 and heated in a suitable heater 82 to a surface temperature of approximately 500°F. The heating causes the circumferential material 52 to expand and also serves to clean its outer surface of any impurities. The material 52 is then suitably tension-wound about the central portion 46. The heat in the material 52 causes it to bury itself in the resin 54 as it is wound onto the joint 30. The resin 54 may be withdrawn in the form of a tape from a reel 84 for application in alternate layers with the material 52, or it may be applied by brush or by spraying or by other suitable method. That is, first a layer of resin 54 is applied over the ends 32a, and then that layer is covered with a layer of circumferential material 52 and so forth. Also, as the filament material 52 cools, it contracts, thereby further embedding itself in the resin 54 and assuring a firm joint construction.

After the winding operation has been completed and the resin cured, it may be desirable to apply to the outer surface of the circumferential material 52 in a manner not shown, the resin 60, FIG. 2, for abrasion resistance, sealing, and protection against corrosion.

While the invention has been particularly shown and described with reference to preferred embodiments, it will be understood by those skilled in the art that a variety of changes in form and details can be made without departing from the spirit and scope of the invention as it is defined by the appended claims.

What is claimed is:

1. A structural joint construction for connecting a first member of composite material to a second member wherein said first member includes an elongated tubular casing having a main body portion and terminating in a plurality of ends of first fiber material fixed thereto and extending beyond said main body and wherein said second member includes an end in abutting relationship with the end of said main body and a connecting region adjacent said end having a central portion of minimal cross-sectional area intermediate opposing portions of greater cross-sectional area, the mean diameter of said opposing portion adjacent said first member being at least as large as the mean diameter of said main body at the end to be connected, the surface area of said second member expanding gradually and smoothly from said central portion to said opposing portions, and connecting means including second fiber material wrapped transversely of the axes of said first and second members around the ends of said first fiber material such that the ends of said first fiber material conform to the contour of said connecting region, said second fiber material substantially filling the peripheral cavity defined by said central portion to achieve a joint construction of generally uniform dimension from one of said opposing portions, across said central portion, to said other opposing portion and which is capable of transmitting loads in tension, bending, and torsion.

2. The construction recited in claim 1 wherein the mean diameter of the extreme outboard end of said second member is less than the maximum mean diameter of said opposing portion adjacent said first member.

3. The construction recited in claim 2 including a filler of resilient material intermediate to said first and second members for maintaining the outer contour of the joint at the interface between said members and preventing stress concentrations in said first member.

4. The construction recited in claim 1 wherein the mean radii of curvature lying in a plane including the longitudinal axis of said second member of the surface of said connecting region between said central portion and each of said opposing portions are substantially similar to each other and to twice the mean transverse cross-sectional radius of said opposing portions.

5. The construction recited in claim 4 wherein the mean diameter of said opposing portions is at least twice the least diameter of said central portion.

6. The construction recited in claim 5 wherein the length of said central portion is at least twice the major diameter of the opposing portion adjacent the end of said second member abutting said first member.

7. The construction recited in claim 1 in which the cross-section cross-section of said second member changes gradually and smoothly from an ovaloid shape adjacent said central portion to a circular shape adjacent said opposing portions.

8. The construction recited in claim 1 wherein the end of said main body adjacent said second member and said connecting regions are ovaloid in cross-section.

9. The construction recited in claim 1 wherein the outer surface of said connecting region is provided with a plurality of longitudinally extending grooves.

10. The construction recited in claim 9 wherein said longitudinally extending grooves are helically disposed on the outer surface of said connecting region.

11. The construction recited in claim 1 wherein said first member is the root end of a rotor blade spar and said second member is a fitting adapted to be mounted to a rotor hub.

* * * * *